(12) United States Patent
Cantin

(10) Patent No.: US 8,810,204 B2
(45) Date of Patent: Aug. 19, 2014

(54) PROTECTION OF A THIN-LAYER BATTERY BY PERIODICALLY OPERATING BATTERY AT MAXIMUM DISCHARGE CURRENT

(75) Inventor: Frédéric Cantin, Tours (FR)

(73) Assignee: STMicroelectronics (Tours) SAS, Tours (FR)

( * ) Notice: Subject to any disclaimer, the term of this patent is extended or adjusted under 35 U.S.C. 154(b) by 275 days.

(21) Appl. No.: 13/223,920

(22) Filed: Sep. 1, 2011

(65) Prior Publication Data

US 2012/0019211 A1 Jan. 26, 2012

(30) Foreign Application Priority Data

Sep. 7, 2010 (FR) ...................... 10 57104

(51) Int. Cl.
*H01M 10/44* (2006.01)
*H01M 10/46* (2006.01)

(52) U.S. Cl.
USPC .......................................... 320/135

(58) Field of Classification Search
USPC ......... 320/107, 114, 115, 127, 131, 132, 135, 320/136
See application file for complete search history.

(56) References Cited

U.S. PATENT DOCUMENTS

| 6,166,522 A | 12/2000 | Patino et al. |
| 6,359,441 B1 | 3/2002 | Bertness |
| 6,566,844 B1 | 5/2003 | Schlicht |
| 2002/0163338 A1 | 11/2002 | Bertness |
| 2003/0025480 A1* | 2/2003 | Pannwitz ..................... 320/134 |
| 2011/0031939 A1* | 2/2011 | Funaba et al. ................ 320/166 |
| 2012/0169292 A1* | 7/2012 | Cantin et al. ................. 320/136 |

FOREIGN PATENT DOCUMENTS

| EP | 1280252 A2 | 1/2003 |
| EP | 2124312 A2 | 11/2009 |

OTHER PUBLICATIONS

French Search Report and Written Opinion dated Jun. 15, 2011 from corresponding French Application No. 10/57104.

* cited by examiner

*Primary Examiner* — Edward Tso
(74) *Attorney, Agent, or Firm* — Wolf, Greenfield & Sacks, P.C.

(57) ABSTRACT

A method for protecting a thin-layer battery connected to an intermittent load including the steps of periodically operating the battery at its maximum discharge current, and disconnecting the battery as soon as the voltage across it reaches a threshold value greater than its critical voltage for the maximum discharge current.

30 Claims, 3 Drawing Sheets

PROTECTION OF A THIN-LAYER BATTERY BY PERIODICALLY OPERATING BATTERY AT MAXIMUM DISCHARGE CURRENT

CROSS REFERENCE TO RELATED APPLICATIONS

This application claims the priority benefit of French patent application number 10/57104, filed on Sep. 7, 2010, entitled PROTECTION OF A THIN-LAYER BATTERY, which is hereby incorporated by reference to the maximum extent allowable by law.

BACKGROUND OF THE INVENTION

1. Field of the Invention

The present invention relates to a system for protecting a thin-layer battery.

2. Discussion of the Related Art

The voltage across a thin-layer battery, as an example, of lithium-ion type, decreases along its operation to reach a critical voltage below which the battery is irreversibly damaged. The battery discharge should thus be stopped and the battery should be recharged before it reaches this critical voltage.

Thin-layer batteries used in systems with an intermittent operation, for example, batteries powering self-contained sensors which periodically communicate data (regularly or not) are here considered. In such systems, very short active periods alternate with inactive periods, which may be long. Further, the thin layer technology used for the batteries necessitates that such batteries to have a strong internal resistance with respect to other batteries.

FIG. 1 is a diagram showing, versus time t, the current I provided by a battery powering such a sensor. Current peaks of high amplitude (for example, 5 mA) and short duration, shorter than half a millisecond, are separated by long periods, lasting for from a few seconds to several hours, during which the current has a very small amplitude (for example, 0.1 mA). Between times t0 and t1, the intermittent load is inactive. The intermittent load is active between times t1 and t2 and between times t3 and t4. The presence of a non-zero current during inactive periods is for example due to the fact that, during these periods, the battery is used to power a low-consumption microcontroller.

Although systems for protecting batteries which detect the time when said batteries approach their critical voltage have been provided, as will be discussed hereafter, such systems are not adapted to thin-layer batteries with an intermittent operation.

SUMMARY OF THE INVENTION

An embodiment provides a method and a device for protecting a battery, adapted to a thin-layer battery connected to a load with an intermittent operation.

An embodiment provides a method for protecting a thin-layer battery connected to an intermittent load comprising the steps of periodically operating the battery at its maximum discharge current, and disconnecting the battery as soon as the voltage thereacross reaches a threshold value greater than its critical voltage for said maximum discharge current.

According to an embodiment, the periodic operation has a duty cycle smaller than 0.1%.

According to an embodiment, the duration of each phase of the periodic operation is shorter than 10 ms.

According to an embodiment, the period of the periodic operation is shorter than 10 minutes.

An embodiment also provides a device for protecting a thin-layer battery connected to an intermittent load comprising a switchable load capable of periodically operating the battery at its maximum discharge current, and a voltage comparator capable of comparing the voltage across the battery with a threshold value greater than the critical voltage of the battery for said maximum discharge current.

According to an embodiment, the switchable load is controlled by first switching means having a duty cycle smaller than 0.1%.

According to an embodiment, the first switching means are capable of forming a signal formed of square pulses having a width smaller than 10 ms.

According to an embodiment, the first switching means are capable of forming a signal having a period shorter than 10 minutes.

According to an embodiment, the device comprises a buffer capacitor in parallel on the intermittent load.

According to an embodiment, the device comprises second switching means arranged between the assembly comprised of the battery and of the switchable load and the assembly comprised of the buffer capacitor and of the intermittent load.

According to an embodiment, the switchable load is a current source.

The foregoing and other objects, features, and advantages will be discussed in detail in the following non-limiting description of specific embodiments in connection with the accompanying drawings.

DETAILED DESCRIPTION

The present inventors have studied the behavior of a battery capable of providing alternately high and low currents and have searched for solutions to optimize the use of such a battery.

Figure 2:
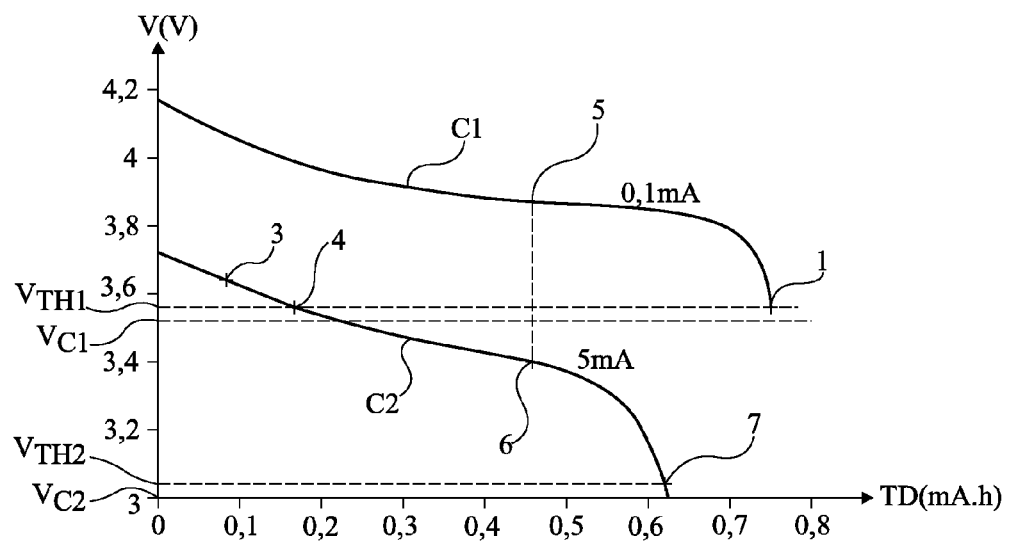
FIG. 2 is a diagram showing the voltage across a battery according to its discharge rate for two discharge current values.

FIG. 2 is a diagram showing voltage V across a specific lithium-ion battery according to its discharge rate TD for two discharge current values, respectively 0.1 and 5 mA. The discharge rate is zero when the battery is fully charged. It increases along the battery operation and should never reach a maximum value, to avoid irreversibly damaging the battery. For a 0.1-mA discharge current, the voltage decreases from an initial 4.2-V voltage to a critical 3.6-V voltage $V_{C1}$. For a 5-mA discharge current, the voltage decreases from an initial 3.75-V voltage down to a critical 3-V voltage $V_{C2}$.

Figure 1:
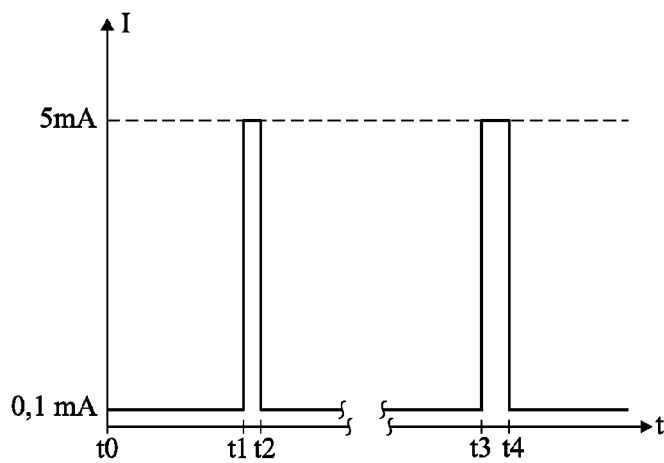
FIG. 1 is a diagram showing an example of the current provided by a battery powering an intermittent load.

Thus, when the battery is connected to an intermittent load with a current varying as illustrated in FIG. 1, the operating point follows curve C1 in inactive periods of the load and follows curve C2 in active periods. Given that the battery may have long inactive periods, it is possible for the operating point to constantly move along curve C1 all the way to point 1 of this curve corresponding to a voltage $V_{TH1}$ slightly greater than voltage $V_{C1}$. To avoid the battery entering an irreversibly damaged state, said battery should be disconnected as soon as point 1 has been reached. The voltage across the battery should thus be permanently compared with a threshold voltage $V_{TH1}$ slightly greater than $V_{C1}$ and the battery should be disconnected as soon as the threshold has been reached.

The choice of a threshold $V_{TH1}$ slightly greater than $V_{C1}$ has a major disadvantage for the battery when operating at its maximum discharge current. If, in active periods of the load, the battery discharges from a point 3 of curve C2, as soon as a point 4 corresponding to voltage $V_{TH1}$ is reached, the battery is disconnected. Similarly, if the battery is at an operating point 5 of curve C1, and the load causes a current surge which should shift the operating point to point 6 of curve C2, the battery is disconnected since the voltage across the battery, for point 6, would be lower than $V_{TH1}$. Thus, for an operation at maximum current, the battery is disconnected at the level of point 4 while it still contains a large amount of power. Point 7 of curve C2 corresponding to a voltage $V_{TH2}$ slightly greater than critical voltage $V_{c2}$ can never be reached for this operating mode.

Figure 3:
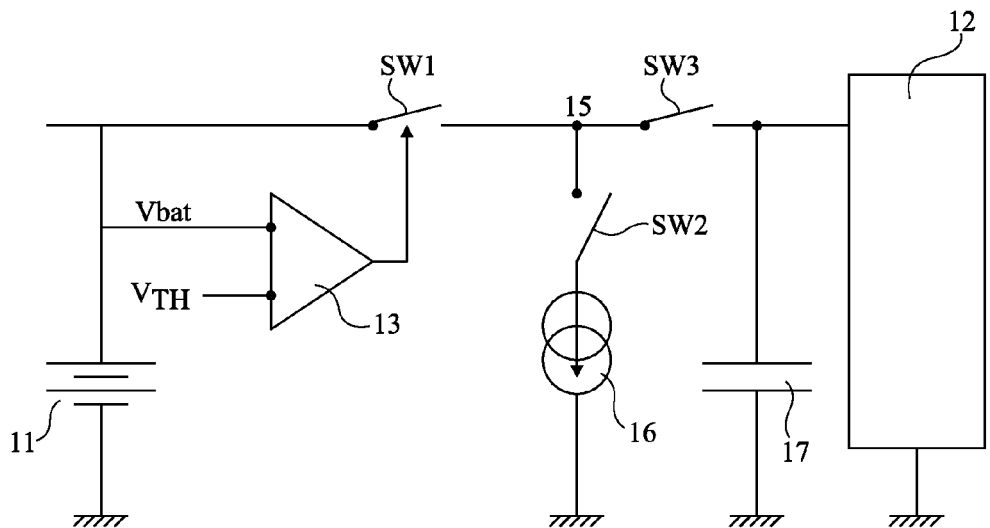
FIG. 3 illustrates an example of assembly of a battery powering an intermittent load provided with a system for protecting the battery.

FIG. 3 illustrates an example of assembly of a battery powering an intermittent load provided with a battery protection system. A battery 11 powers an intermittent load 12. A voltage comparator 13 compares the voltage across the battery with a threshold $V_{TH}$. This comparator is connected to the control terminal of a switch SW1 having a first terminal connected to battery 11 and a second terminal connected to a node 15. Node 15 is connected by a switch SW2 to a load 16, called switchable load hereafter, and by a switch SW3 to a first terminal of a buffer capacitor 17 and to load 12.

The assembly illustrated in FIG. 3 is provided to operate according to one or the other of two modes. These two modes periodically follow each other until battery 11 is disconnected.

In a first mode, switches SW1 and SW3 are on and switch SW2 is off. In inactive periods of load 12, battery 11 briefly charges buffer capacitor 17, and then powers a microcontroller (not shown) under a 0.1-mA current. In active periods of load 12, battery 11 and buffer capacitor 17 power load 12, the capacitor being sized to provide most of the peak current to the load and to limit the current peak required from the battery (here to 5 mA). The strong internal resistance of the battery would prevent it from providing a stronger current.

In a second so-called forced operating mode, switch SW1 is on, switch SW2 is turned on for a short time, and switch SW3 is turned off for a short time. Switchable load 16 forces the battery to operate at its maximum 5-mA discharge current. In an active period, load 12 remains powered by buffer capacitor 17.

Figure 4:
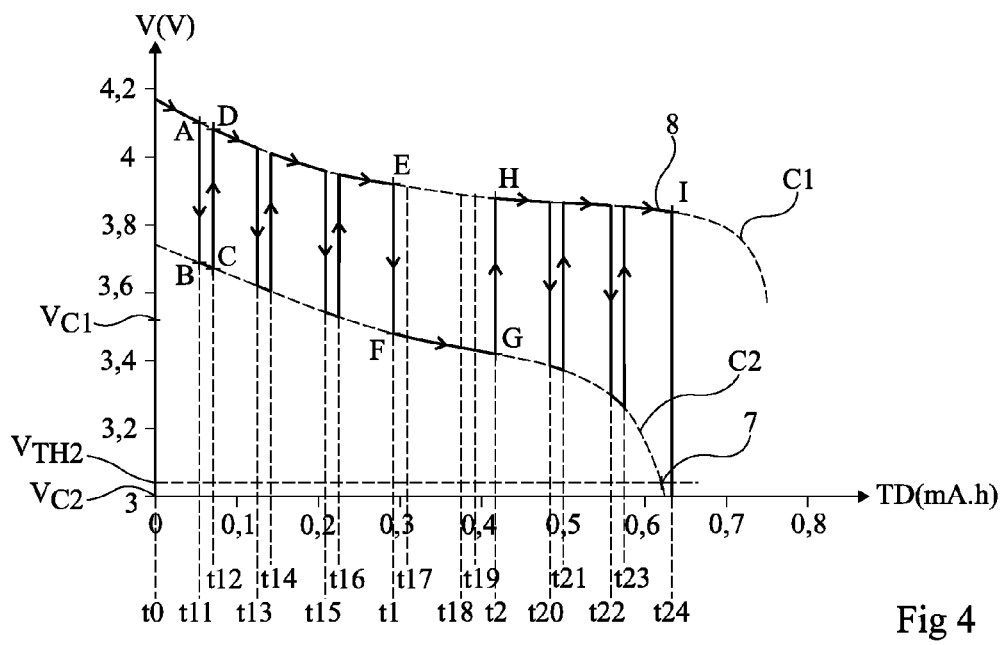
FIG. 4 is a diagram similar to that of FIG. 2 which illustrates the variation of the voltage across a battery connected as illustrated in FIG. 3.

FIG. 4 is a diagram similar to that of FIG. 2 which illustrates the variation of the voltage across a battery connected in an assembly of the type in FIG. 3, with an intermittent load 12 having an activity corresponding to the current illustrated in FIG. 1.

At an initial time t0, battery 11 is fully charged and the voltage thereacross is 4.2 V. Indeed, the discharge current is 0.1 mA since load 12 is not active, as illustrated in FIG. 1. Switches SW1 and SW3 are on, and switch SW2 is off. Capacitor 17 charges and the voltage across the battery decreases along curve C1.

At a time t11, switch SW2 is turned on for a short time while SW3 is turned off. Switch SW1 remains on. Load 16 forces battery 11 to operate at 5 mA. The voltage across battery 11 drops vertically from point A of curve C1 to point B of curve C2. It is then shifted along curve C2 from point B to point C corresponding to a time t12. At time t12, switch SW2 is turned off and SW3 is turned on. Load 12 being inactive, the value of the discharge current of battery 11 varies from 5 mA to 0.1 mA, from point C of curve C2 to point D of curve C1.

This short round trip between curves C1 and C2 of the voltage across the battery is repeated at times t13 and t15. Times t11, t13, and t15 are preferably regularly spaced apart. Time intervals t11 to t12, t13 to t14, and t15 to t16, during which load 16 forces the operation of battery 11 to a 5-mA discharge current, are short and preferably equal.

At time t1, defined in FIG. 1, intermittent load 12 becomes active. The current provided by battery 11 increases from 0.1 mA to 5 mA. The operating point shifts from point E of curve C1 to point F of curve C2. Between times t1 and t2, the current provided by the battery is equal to 5 mA. The operating point shifts from point F to point G of curve C2. At time t2, the current provided by battery 11 decreases from 5 mA to 0.1 mA. The operating point shifts from point G to point H of curve C1.

Since load 16 periodically forces the operation of the battery to a 5-mA discharge current, iterations of this forced operation are likely to occur between times t1 and t2. In the shown example, a first iteration substantially occurs at time t1 and ends at a time t17, and a second one starts at a time t18 and ends at a time t19. As seen previously, such iterations have no influence on the power supply of load 12 due to the presence of buffer capacitor 17.

After time t2, load 12 remains inactive, the battery operating point moves along curve C1 except during the time intervals from t20 to t21 and from t22 to t23. Such time intervals correspond to two iterations of the forced operation.

At a time t24, a new iteration of the forced operation starts. Battery 11 then attempts to operate at a 5-mA discharge current. The operating point cannot pass from a point I of curve C1 to a point of curve C2 without the voltage across the battery becoming lower than a voltage $V_{TH2}$ slightly greater than $V_{C2}$. The battery discharge is interrupted by the turning off of switch SW1 as soon as the voltage across the battery is equal to voltage $V_{TH2}$.

It should be noted that, in our example, that is, thin-layer batteries for self-contained to sensors, a system for recovering power (heat, vibration, radiation, light) intermittently charges the battery (when the power source is available). This system (not shown herein) automatically reconnects the battery which has secured itself at time t24, when the power source is available again.

This automatic reconnection does not endanger the battery discharged at time t24 since the power supply can only raise its voltage and draw it away from threshold $V_{TH2}$.

It is thus provided herein to submit the battery to repeated iterations of high-current operation and to select, as threshold voltage $V_{TH}$, a value $V_{TH2}$ slightly greater than critical voltage $V_{C2}$ corresponding to an operation with a high current. This choice of a threshold $V_{TH2}$ slightly greater than $V_{C2}$ is very advantageous for the battery when operating at its maximum discharge current. Indeed, the battery is disconnected at operating point 7 only, that is, when all the power available in the battery for a 5-mA current has been used.

The periodicity of the forced operation is selected to be short, so that above-mentioned point I is not very distant from point 8 of curve C1, located vertically above point 7 of curve C2, and so that point I is very distant from the end point of curve C1 corresponding to the critical voltage at low current. In the example illustrated in FIG. 4, the battery can provide a 0.1-mA current for more than one hour when the operating point moves along curve C1 from point 8 to the end point. This end point does not risk being reached if the periodicity of the forced operation is selected to be much shorter than one hour, for example, on the order of some ten minutes.

Further, the duration of the forced operation will be selected to be short, to minimize the electric consumption induced by the many iterations of the forced operation.

Figure 5A:
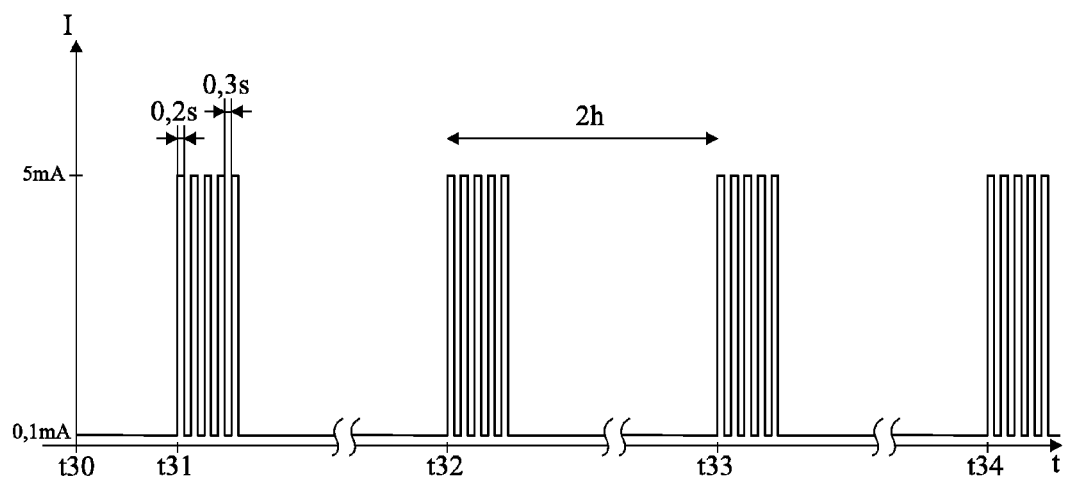
FIG. 5A is a diagram showing an example of the current provided by a battery powering a specific intermittent load.

FIG. 5A shows an example of the variation of current I along time t, linked to the coupling of a battery and of a specific intermittent source.

Between times t30 and t31, the load is inactive. Starting from time t31, five current pulses of a duration of 0.2 s each are separated by 0.3 s. Then, until a time t32 equal to t31 plus two hours, the current remains low. At time t32 and at subsequent times t33=t32+2 h and t34=t33+2 h, new groups of five pulses identical to those corresponding to time t1 start. Between the 5-mA current pulses, the current is equal to 0.1 mA.

Figure 5B:
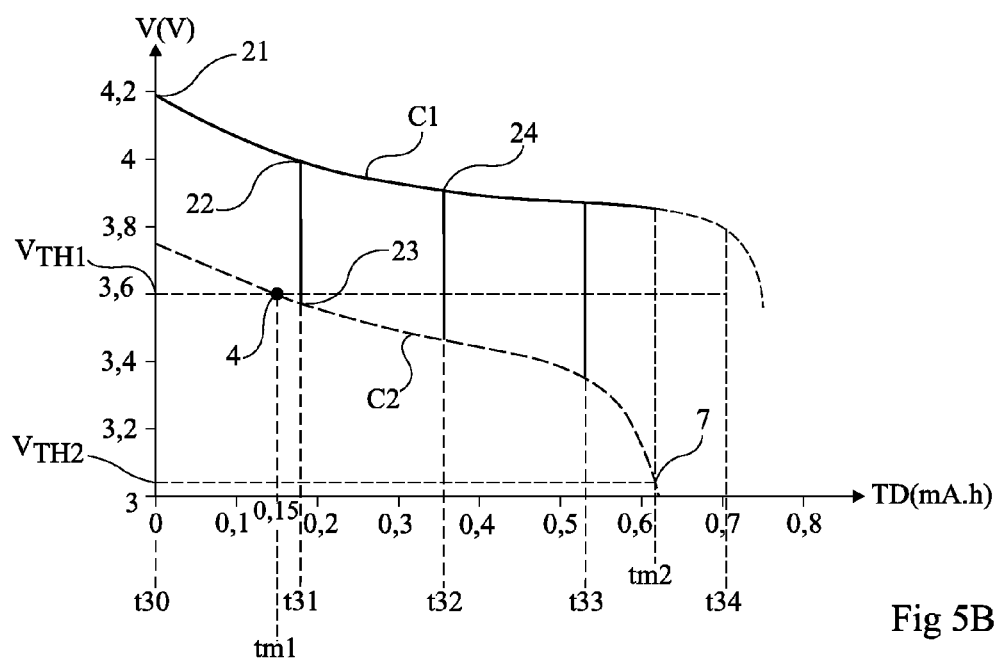
FIG. 5B is a diagram similar to that of FIG. 2 illustrating the variation of the voltage across a battery providing the current of FIG. 5A.

FIG. 5B is a diagram similar to that of FIG. 2 which illustrates the variation of the voltage across a battery connected to the intermittent load for which the current is described in FIG. 5A.

Between times t30 and t31, the battery operating point shifts from a point 21 to a point 22 of curve C1 corresponding to the time.

The operating point then tends to shift from point 22 of curve C1 to a point 23 of curve C2.

With the method wherein the threshold voltage is chosen to be equal to $V_{TH1}$, it is impossible to reach point 23, which is to the right of point 4 described in relation with FIG. 2. The battery is disconnected at point 23 without ever having powered the intermittent load, while it still contains energy. For the battery to power the intermittent load with a 5-mA current, time t1 would have had to come before a time tm1 corresponding to point 4 of curve C2 for which the voltage across the battery is equal to $V_{TH1}$.

However, if forced operation phases and a threshold voltage equal to $V_{TH2}$ are provided as described hereabove, the battery operation can carry on. The battery operating point performs five round trips (not shown) between curve C1 and curve C2 corresponding to the five 5-mA current pulses. Then, the battery operating point follows curve C1 until it reaches a point 24 corresponding to time t32. At times t32 and t33, the battery operating point performs five other round trips between curve C1 and curve C2. At time t4, the battery operating point cannot pass onto curve C2 since it is then far to the right of above-mentioned point 7 and the battery will have been disconnected.

In this case, the battery powers the intermittent load for 3 groups of 5 current pulses. The battery is only disconnected when all the power available for a 5-mA current has been used.

Of course, the present invention is likely to have many variations.

For example, the battery is not necessarily a lithium ion battery, or even a thin-layer battery. The battery protection system provided herein applies to any battery having a high internal impedance and discharging as illustrated in FIG. 2, and which has a critical voltage below which it can be irreversibly damaged.

It is possible not to immediately disconnect the battery when the threshold value is reached. It may for example power an audio or visual warning indicating that it should be recharged.

The switchable load may be a current source, and more specifically a current mirror.

The buffer capacitor, which has the function of powering the intermittent load during the forced operation and of limiting the value of the maximum discharge current of the battery during active periods of the intermittent load, may have a capacitance of a few hundreds of to microfarads. This buffer capacitor is optional if no iteration of the forced operation coincides with active periods of the intermittent load, and if the current peak surged by the load does not exceed that which can be provided by the sole battery. It may also be replaced with any power source having the same function.

The value of the maximum discharge current, as well as the duration and the periodicity of the forced operation will be chosen by those skilled in the art according to the desired performance of the battery protection system.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for protecting a thin-layer battery connected to an intermittent load comprising the steps of:
    periodically operating the battery at its maximum discharge current, and
    disconnecting the battery as soon as the voltage across it reaches a threshold value greater than its critical voltage for said maximum discharge current.

2. The method of claim 1, wherein the periodic operation has a duty cycle smaller than 0.1%.

3. The method of claim 1, wherein the duration of each phase of the periodic operation is shorter than 10 ms.

4. The method of claim 1, wherein the period of the periodic operation is shorter than 10 minutes.

5. A device for protecting a thin-layer battery connected to an intermittent load comprising:
    a switchable load capable of periodically operating the battery at its maximum discharge current, and
    a voltage comparator capable of comparing the voltage across the battery with a threshold value greater than the critical voltage of the battery for said maximum discharge current.

6. The device of claim 5, wherein the switchable load is controlled by first switching means having a duty cycle smaller than 0.1%.

7. The device of claim 6, wherein the first switching means are capable of forming a signal formed of square pulses having a width smaller than 10 ms.

8. The device of claim 6, wherein the first switching means are capable of forming a signal having a period shorter than 10 minutes.

9. The device of claim 5, comprising a buffer capacitor in parallel on the intermittent load.

10. The device of claim 9, comprising second switching means arranged between the assembly comprised of the battery and of the switchable load and the assembly comprised of the buffer capacitor and of the intermittent load.

11. The device of claim 5, wherein the switchable load is a current source.

12. A method for operating a battery connected to an intermittent load, comprising:
 supplying current to the intermittent load during a normal operating mode;
 supplying a maximum discharge current from the battery to a switchable load periodically during a forced operating mode; and
 disconnecting the battery from the intermittent load when a voltage of the battery drops to a threshold value greater than a critical battery voltage at the maximum discharge current.

13. A method for operating a battery as defined in claim 12, wherein supplying current to the intermittent load comprises supplying current to the intermittent load from the battery and from a buffer capacitor when the forced operating mode is inactive.

14. A method for operating a battery as defined in claim 13, wherein supplying current to the intermittent load comprises supplying current to the intermittent load from the buffer capacitor when the forced operating mode is active.

15. A method for operating a battery as defined in claim 12, wherein the normal operating mode and the forced operating mode overlap in time.

16. A method for operating a battery as defined in claim 12, wherein a duty cycle of the forced operating mode is less than 0.1%.

17. A method for operating a battery as defined in claim 12, wherein a duration of the forced operating mode is less than 10 milliseconds.

18. A method for operating a battery as defined in claim 12, wherein a period of the forced operating mode is less than 10 minutes.

19. A method for operating a battery as defined in claim 12, adapted for operation of a thin-layer battery.

20. A method for operating a battery as defined in claim 12, adapted for operation of a lithium ion battery.

21. A device for protecting a battery connected to an intermittent load, comprising:
 a switchable load configured to periodically operate the battery at a maximum discharge current in a forced operating mode;
 a comparator configured to compare a voltage of the battery with a threshold value greater than a critical battery voltage at the maximum discharge current; and
 a first switch configured to disconnect the battery from the intermittent load when the comparator detects that the battery voltage has crossed the threshold value.

22. A device for protecting a battery as defined in claim 21, further comprising a buffer capacitor coupled in parallel with the intermittent load.

23. A device for protecting a battery as defined in claim 22, further comprising a second switch in series with the switchable load and a third switch coupled between the switchable load and the intermittent load.

24. A device for protecting a battery as defined in claim 21, wherein the switchable load comprises a current source.

25. A device for protecting a battery as defined in claim 21, wherein a duty cycle of the forced operating mode is less than 0.1%.

26. A device for protecting a battery as defined in claim 21, wherein a duration of the forced operating mode is less than 10 milliseconds.

27. A device for protecting a battery as defined in claim 21, wherein a period of the forced operating mode is less than 10 minutes.

28. A device for protecting a battery as defined in claim 21, configured to protect a thin-layer battery.

29. A device for protecting a battery as defined in claim 21, configured to protect a lithium ion battery.

30. A device for protecting a battery as defined in claim 23, wherein the second switch is closed and the third switch is open when the switchable load periodically operates the battery at the maximum discharge current.

* * * * *

UNITED STATES PATENT AND TRADEMARK OFFICE
CERTIFICATE OF CORRECTION

PATENT NO. : 8,810,204 B2
APPLICATION NO. : 13/223920
DATED : August 19, 2014
INVENTOR(S) : Frédéric Cantin It is certified that error appears in the above-identified patent and that said Letters Patent is hereby corrected as shown below:

In the Specification:

In Column 3, Line 29, "$V_{c2}$" should read --$V_{C2}$--;

In Column 5, Line 22, "t33=t32+2 h and t34=t33+2 h" should read --t33=t32+2h and t34=t33+2h--; and In Column 6, Line 11, the word "to" should be deleted.

Signed and Sealed this
Fourth Day of November, 2014

Michelle K. Lee
*Deputy Director of the United States Patent and Trademark Office*